Figure 1:
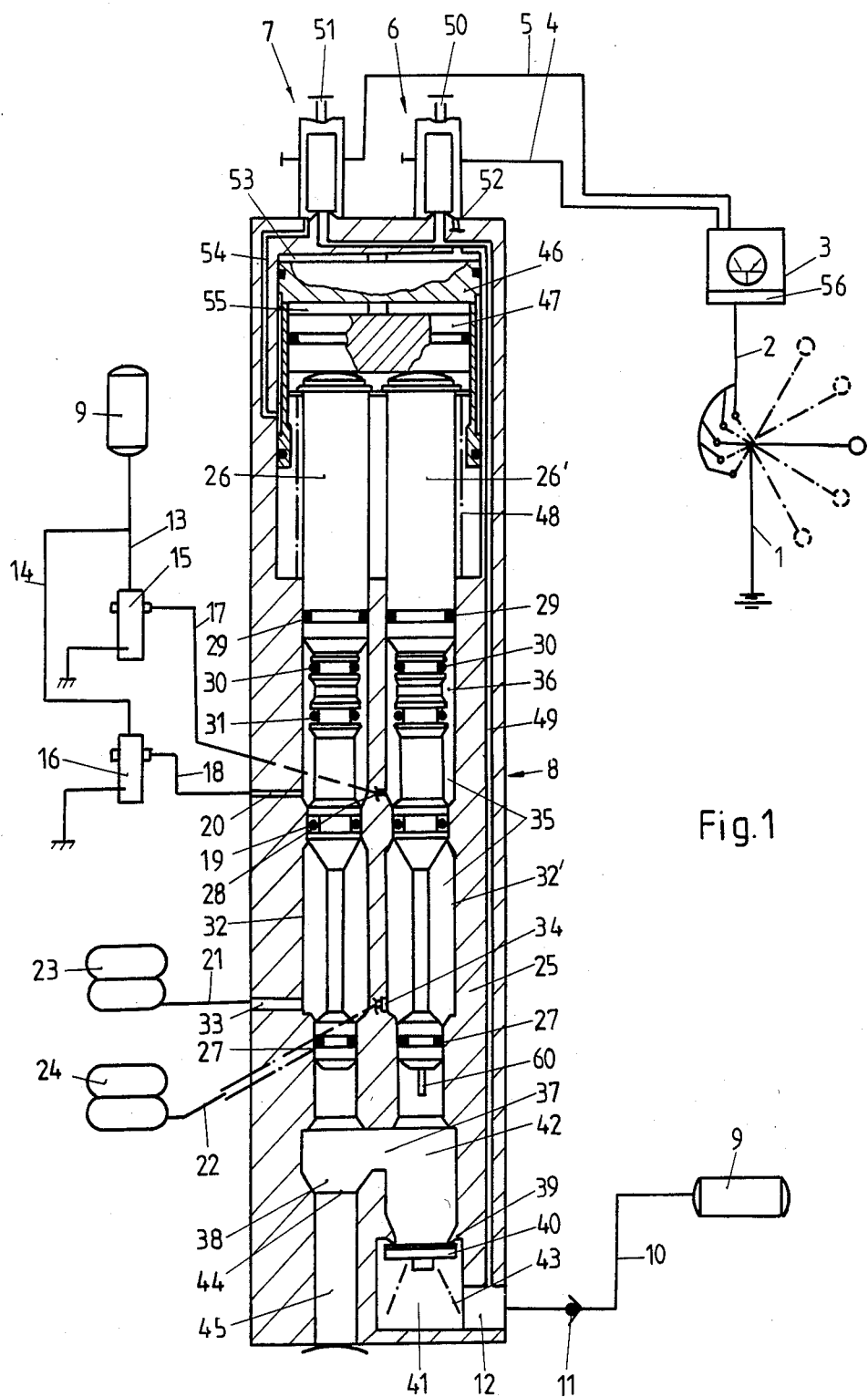

United States Patent [19]

Blanz

[11] Patent Number: 4,697,822
[45] Date of Patent: Oct. 6, 1987

[54] CONTROL ARRANGEMENT FOR RAISING AND LOWERING THE VEHICLE BODY OF AIR-SUSPENDED VEHICLES

[75] Inventor: Rolanz Blanz, Heiligkreuzsteinach, Fed. Rep. of Germany

[73] Assignee: Graubremse GmbH, Heidelberg, Fed. Rep. of Germany

[21] Appl. No.: 808,857

[22] Filed: Dec. 13, 1985

[30] Foreign Application Priority Data

Dec. 14, 1984 [DE] Fed. Rep. of Germany ....... 3445579

[51] Int. Cl.⁴ ............................................. B60G 17/04
[52] U.S. Cl. .............................. 280/6 H; 280/DIG. 1
[58] Field of Search ........ 280/6 R, 6 H, 714, DIG. 1; 180/41

[56] References Cited

U.S. PATENT DOCUMENTS

| | | | | |
|---|---|---|---|---|
| 3,836,161 | 9/1974 | Buhl | ..................................... | 280/6 H |
| 3,917,307 | 11/1975 | Shoebridge | .......................... | 280/6 H |
| 4,335,901 | 6/1982 | Gindish | ................................ | 280/714 |

FOREIGN PATENT DOCUMENTS 2645468  4/1978  Fed. Rep. of Germany .
3344022  6/1985  Fed. Rep. of Germany .
3424670  1/1986  Fed. Rep. of Germany .

Primary Examiner—John J. Love
Assistant Examiner—Ross Weaver
Attorney, Agent, or Firm—Neuman, Williams, Anderson & Olson

[57] ABSTRACT

The control arrangement is equipped with a compressed air source, at least one leveling valve (15), with air suspension bellows (24) assigned to at least one vehicle axle, a switching valve (8) and an electric switch (1), which permits controlling the positions Stop, Raise, Lower and Drive. The switching valve (8) is electrically driven by two solenoid valves (6 and 7) and connects or interrupts the different pneumatic lines as is common in the art. With a no-pressurized switching valve (8) and/or non-energized solenoid valves (6, 7), however, the respective pneumatic lines (17, 18) from the switching valve (8) to the leveling valve (15) on the one hand and to the air suspension bellows (24) on the other hand are closed off. The positions Raise, Lower and Drive are assigned to the three activated positions of the two solenoid valves (6, 7).

4 Claims, 6 Drawing Figures

CONTROL ARRANGEMENT FOR RAISING AND LOWERING THE VEHICLE BODY OF AIR-SUSPENDED VEHICLES

The invention relates to a control arrangement for the random raising and lowering of the vehicle body of air-suspended vehicles with level control, with a compressed air source, at least one leveling valve, with air suspension bellows assigned to at least one vehicle axle which air suspension bellows can be connected to the compressed air source or an unpressurized exhaust via the corresponding leveling valve in order to adjust a specified distance between vehicle body and vehicle axle, and a switching valve with the positions Raise, Lower, Drive and Stop which is built into the line connections of the leveling valves with the air suspension bellows or with the compressed air source and the unpressurized exhaust, said switching valve having at least one sliding member pilot-controlled by two solenoid valves or a valve construction and releasing the line connection in the Drive position and interrupting it in the other positions and connecting the air suspension bellows with the compressed air source in the Raise position and with the unpressurized exhaust in the Lower position.

Such a control arrangement has been described in the previous patent application No. P 33 44 022. There, the switching valve has only one sliding member which is remotely controlled for the four positions by an electric switch via two solenoid valves such that it can be shifted from a resting position by a first distance only when the first solenoid valve is energized, by a second distance only when the second solenoid valve is energized which second distance is different from the first distance, and when both solenoid valves are energized by a third distance corresponding to the sum total of the first and second distance. In this case, the line connections and the corresponding seals in the switching valve and at the sliding member are arranged and configured so that, as exemplified, the Drive position is assigned to the non-energized position of the two solenoid valves, while in the Stop position one of the two solenoid valves is energized. This assignment of positions is normal and makes sense insofar as during travel which is of considerably longer duration compared to the other positions the solenoid valves do not carry current. This ensures at the same time that in case of a power failure during Drive and with the compressed air supply intact the air suspension bellows will be supplied properly with compressed air via the leveling valve(s). However, there are also operating conditions in which such an assignment can be considered a disadvantage.

In the patent application No. P 34 24 690 a similar arrangement has been previously described, in which the switching valve is comprised of several individual sliding members arranged in a common housing which can be activated jointly and in the same direction via two pistons controlled by the solenoid valves. In this case, as exemplified, the Drive position is also assigned to the non-energized state of the two solenoid valves, so that in case of a power failure during driving and with the compressed air supply intact the regular pressure supply to the air suspension bellows is ensured.

Published patent application DE-OS No. 26 45 468 shows a control arrangement with an electric switch and using two solenoid valves which are, however, placed in series with and ahead of an air suspension leveling valve. The one solenoid valve is arranged in a control line, while the other solenoid valve is provided for in the supply line for supplying the air suspension leveling valve. Using these two solenoid valves, in addition to the Raise and Lower functions only one third, neutral position can be selected in which the vehicle body is to be neither raised nor lowered.

A setting to the Drive position when the solenoid valves do not carry current is the normal position since this keeps the solenoid valves free of a continuous load. However, if such a vehicle has to be driven, for instance, into a hall with only limited height where it is necessary to lower the vehicle body to the Lower position in order to stay below the height limit and if the electric supply to the solenoid valves fails the Drive position will be set automatically, so that the vehicle body is raised and thus hits the hall. If during another type of accident with the electric supply intact a malfunction occurs in the compressed air line between the leveling valve and switching valve during driving the vehicle body can also drop depending on the circuit. While an emergency operation can be maintained in this manner, the air suspension system does not function.

It is the object of the present invention to develop further a control arrangement of the type described at the beginning that all essential pneumatic line connections will be closed off from each other in case of a pressure and/or electric failure in the pilot control, so bhat in case of such a defect the pressure present for the operating situation at the time will be closed off in the air suspension bellows and will thus be maintained.

The invention achieves this by configuring the sliding member of the switching valve such and having it in such an original state when the switching valve is non-pressurized and/or the solenoid valves are not energized that the pneumatic lines from the switching valve to the leveling valve on the one hand and to the air suspension bellows on the other hand are each closed off, and that the positions Raise, Lower and Drive are assigned to the three activated positions of the two solenoid valves. The present invention goes beyond the normal state of the art and no longer assigns the Drive position, but the Stop position to the non-energized original position of the two solenoid valves or of the sliding member(s) of the switching valve. While with this unusual measure one has to accept that for instance in case of a failure in the electric supply the air suspension bellows can no longer be resupplied if there is a slow leakage, closing off the air suspension bellows in this type of an accident provides other advantages. For instance, one can drive through a low-ceiling hall without danger of causing damage even if the electric supply has been temporarily interrupted. The invention can be used with a quite different configuration of the electric switching valve. This switching valve can have one or several sliding members, or can be constructed in a completely different manner, for instance using a valve construction. Neither is it absolutely necessary that the two pistons are arranged on one side of the valve and move in the same direction for traveling the different distances. A movement in the opposite direction and/or a separate arrangement of the pistons at one and the other end of the sliding member(s) is entirely possible.

Assigning the Drive position to the activation of only one solenoid valve and the Raise position to the activation of both solenoid valves has the advantage that in the Drive position which remains activated for a relatively long time still only one solenoid valve is energized continuously.

The switching valve comprises an electrical switch or a key. If a switch is used it should have a center position assigned to the Stop position with the other three positions reachable only from this center position. While the sequence of the switch positions still does not tell anything about the sequence of the switching valve positions, considering the sequence of switch operations an advantageous sequence is ensured nevertheless since the three active positions Raise, Lower and Drive must always be followed by the Stop position and can only be terminated by this Stop position. When using a key the arrangement can be such that for instance the pushbutton key assigned to the Raise position resets to the Stop position when released. Actually, if the Stop position is assigned to the non-energized original position the remaining three active positions Raise, Lower and Drive can be arranged in a total of six different sequences, as will be explained in the exemplified embodiments. However, this arrangement is again independent of the switch or key configuration.

To exclude the disadvantage related to the invention inasmuch as at least one solenoid valve has to be energized in the Drive position it is also possible to place a time-dependent circuit breaker in series with and ahead of the solenoid valves of the switching valve. This circuit breaker ensures that the solenoid valve(s) can be energized for only a limited time in one or several of the active positions. For instance, the circuit breaker can become operative only when the active Drive position is set. In this case the supply of pressure to the air suspension bellows via the leveling valve(s) takes place for a certain limited period of a few seconds or at the most a few minutes only so that it can be assumed that the air suspension bellows are supplied with compressed air according to the load situation. Then, under time control the electric control line of the respective solenoid valve(s) can be interrupted so that the Stop position is set in which the air suspension bellows are closed off and locked by the switching valve. In addition to other advantages this results in a very low air consumption. A multi-circuit configuration of the pneumatic springs can also be implemented very easily where advantageously only one leveling valve is required. On the other hand, it is of course possible to assign this circuit breaker to or place it in series with and ahead of not only the Drive position but also the other active positions Raise and Lower, so that the additional advantage is obtained that when a Raise operation is triggered it will last for only a certain time period and thus the vehicle body will be raised by only a certain distance. If, for instance, this Raise operation is not sufficient the controlled motion can be performed a second time.

The invention will be described further using a number of exemplified embodiments. It is shown in FIG. 1 the essential parts of a first control arrangement in the Stop position FIG. 2 the control arrangement of FIG. 1 in the Drive position FIG. 3 the control arrangement of FIG. 1 in the Lower position FIG. 4 the control arrangement of FIG. 1 in the Raise position FIG. 5 a further embodiment of the control arrangement with a comparatively more simply configured switching valve using only one leveling valve in the Stop position and FIG. 6 a further embodiment of the control arrangement with a switching valve having only one sliding member.

An electric switch 1 allows setting of the five positions indicated, where the Stop position is provided for in duplicate always following the Raise or Lower position. The Drive position can be located between the Raise and Lower positions. In principle, the arrangement can also be configured differently, as seen, for instance, in FIG. 6. Four positions are necessary. Corresponding electric connecting lines 2 lead to a power supply and process controller arrangement 3. Two electric lines 4 and 5 lead to a first solenoid valve 6 or to a second solenoid valve 7 which are already arranged at or close to a pneumatic switching valve 8 which can be located at the vehicle body or close to the axle to be controlled or the air suspension bellows respectively.

A common pneumatic compressed air source not shown here is provided which supplies a reservoir 9. From there a pneumatic line 10 leads to a connection 12 at switching valve 8 via a check valve 11. Additional pneumatic lines 13 and 14 lead to leveling valves 15 and 16 which are configured as known in the art. Lines 17 and 18 lead to connections 19 and 20 at the pneumatic switching valve. Air suspension bellows 23 or 24 are connected via lines 21 and 22. Air suspension bellows 23 can be assigned, for instance, to the front axle, and air suspension bellows 24 to the rear axle. An assignment with the air suspension bellows to the right and left of an axle, or a different assignment is also possible. Line 13, leveling valve 15, lines 17 and 21 and air suspension bellow 23 form an air suspension circuit. Analogously, this applies to the second air suspension circuit shown. It is understood that pneumatic switching valve 8 can also be configured in a simple manner for a third or also for a fourth air suspension circuit. It is also possible to provide for only one leveling valve instead of the two leveling valves 15 and 16 so that the duality of the two air suspension circuits does not start until switching valve 8.

In particular, switching valve 8 has a housing 25 in which several individual sliding members 26, 26' are slideably located. Individual sliding members 26 and 26' have circular seals 27, 28, 29, 30, 31 which are provided in relationship to the housing configuration as shown and to connections 19, 20 as well as further connections 33 and 34 for air suspension bellows 23 or 24. In housing 25, two bore holes 32 and 32' are provided, here in a graduated configuration, in which the individual sliding members 26 and 26' are slidably and sealingly guided. Between seals 27 and 31 at the two sliding members 26 and 26' a circular groove 35, each time interrupted by seal 28, is provided through which in the Drive position (FIG. 2) in connection with the correspondingly off-set bore holes 32 and 32' contact 20 is connected with contact 33 on the one hand and contact 19 with contact 34 on the other hand. In the original or resting position shown in FIG. 1 which corresponds to the Stop position the two solenoid valves 6 and 7 are not energized and both connections 19 and 20 to leveling valves 15 and 16 as well as connections 33 and 34 to air suspension bellows 23 and 24 are closed off. A further circular groove 36 can be provided between seals 30 and 31 or 29 and 31 respectively. A connecting channel 37 leads to an exhaust chamber 38 and on the other hand to an intake valve 39, 40 comprised of a valve body 40 and a housing rim 39. Compressed air is applied via an intake chamber 41 and connection 12. Below individual sliding members 26 and 26' a pressure chamber 42 is provided from which intake valve 39, 40 on the one hand and exhaust valve 27, 44 on the other hand are reachable via connecting channel 37, which exhaust valve is comprised of seal 27 and a rim 44 of housing 25. Valve body 40 is supported by a spring on the housing side. A vent hole 45 leads from exhaust chamber 38 to atmosphere. Individual sliding member 26' has an extension 60 to activate intake valve 39, 40. The stroke geometry of extension 60 or of individual sliding member 26' is correspondingly configured to activate valve body 40 of intake valve 39, 40. The same applies to the arrangement of the other seals at individual sliding members 26 and 26' in connection with graduated bore holes 32 and 32'.

On the other side of individual sliding members 26, 26' close to solenoid valves 6 and 7 two control pistons 46 and 47 are located and sealingly arranged. Control piston 46 can perform a first piston stroke to the Lower position (FIG. 3) if it alone receives compressed air which is achieved by energizing solenoid valve 6. Control piston 46 can perform a comparatively smaller piston stroke to the Drive position (FIG. 2) which is achieved by energizing solenoid valve 7 only. Both individual sliding members 26 and 26' are in contact with control piston 47 and through it with control piston 46. If solenoid valves 6 and 7 are energized simultaneously both strokes of control pistons 46 and 47 are added so that the Raise position (FIG. 4) is reached. To return control pistons 46 and 47 to their original position a return spring 48 is provided. Via a supply line 49 which can be connected to intake chamber 41 or which can also be connected separately to a reservoir (FIG. 5) compressed air is applied to both solenoid valves 6 and 7 whose intake seats are, however, closed in the non-energized position. Solenoid valves 6 and 7 have vent openings 50 and 51. From solenoid valve 6 a line 52 leads to work surface 53 of control piston 46. From solenoid valve 7 a line 54 to work surface 55 of control piston 47. The geometric conditions of the different strokes of control pistons 46 and 47 and the distances of seals 27 to 31 from each other as well as the diameter configuration of individual sliding members 26 and 26' and graduated bore holes 33 and 32' are correspondingly matched with each other. Actually, this matching can be done in various ways, i.e. there are several possibilities to distribute the four positions Stop, Drive, Raise and Lower and to assign them to the individual positions of control pistons 46 and 47. The basic possibilities are shown in the following table:

| 7 | 6 | | | | | | |
|---|---|---|---|---|---|---|---|
| − | − | Stop | Stop | Stop | Stop | Stop | Stop |
| + | − | Drive | Lower | Drive | Raise | Lower | Raise |
| − | + | Lower | Drive | Raise | Drive | Raise | Lower |
| + | + | Raise | Raise | Lower | Lower | Drive | Drive |

It is apparent that the exemplified embodiment shown in FIGS. 1 to 4 represent the first of the six possibilities (columns) or corresponds to such a distribution. FIG. 1 shows the Stop position, FIG. 2 the Drive position, FIG. 3 the Lower position and FIG. 4 the Raise position. FIG. 5 shows an example of an arrangement where the sequence according to column 2 is implemented.

The arrangement according to the exemplified embodiment of FIGS. 1 to 4 works as follows:

In the original Stop position according to FIG. 1 lines 17 and 18 are closed off from leveling valves 15 and 16 by seals 28 and 29. On the other hand, lines 21 and 22 to air suspension bellows 23 and 24 are closed off by seals 27 and 28. Intake valve 39, 40 is closed. Discharge valve 27, 44 is open. Solenoid valves 6 and 7 are not energized, so that the work surfaces 53 and 55 of control pistons 46 and 47 are vented by vent openings 50 and 51, i.e. they are connected to atmosphere. Return spring 48 keeps control pistons 46 and 47 in their original position. The non-energized position of solenoid valves 6 and 7 is set whenever one of the two Stop positions is set at switch 1. The same relative position of the components occurs also when the power supply is interrupted, so that solenoid valves 6 and 7 will be without current.

Figure 2:
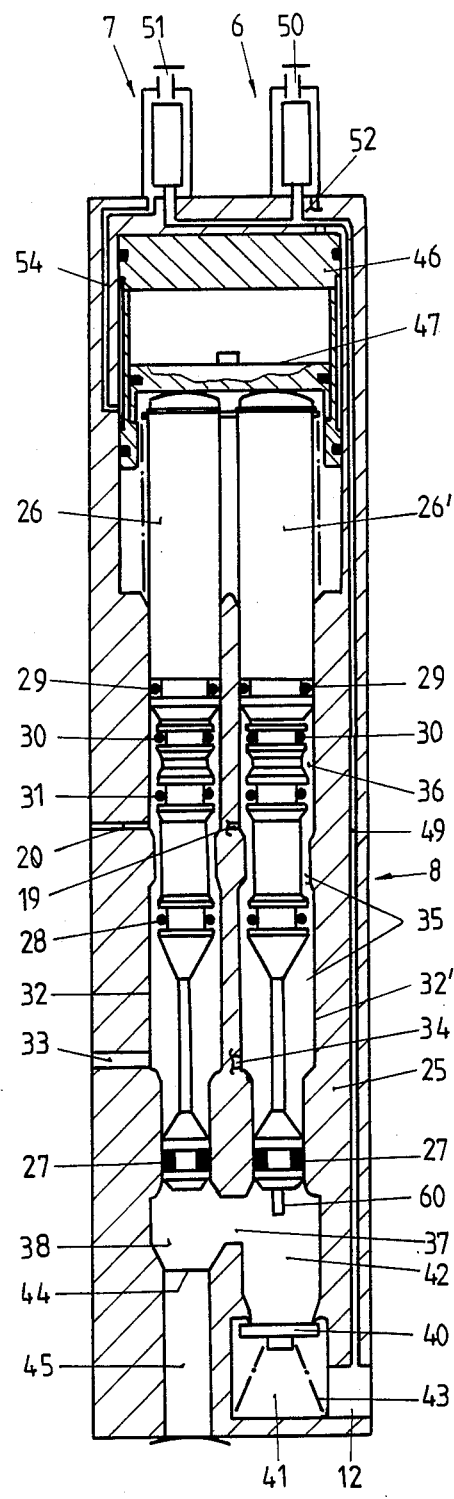

If switch 1 is turned to the Drive position, only solenoid valve 7, but not solenoid valve 6 is energized which results in a relative position of the components as shown in FIG. 2. Control piston 46 remains at rest, while control piston 47 travels its corresponding stroke to the stop in control piston 46. Thus, the two individual sliding members 26 and 26' are moved by the corresponding distance. Seals 28 reach into an extended area of graduated bore holes 32 and 32' so that line 17 is connected with line 22 on the one hand and line 18 with line 21 on the other hand. Seals 27 continue to remain in the sealing position. According to the load situation, leveling valves 15 and 16 now direct compressed air to air suspension bellows 23 or 24 respectively. This can be done continuously; however, in this case solenoid valve 7 must also remain energized continuously. If this continuous energizing is not desired, it is possible to locate a time-dependent circuit breaker 56 inside the power supply arrangement which interrupts the supply of power to solenoid valves 7 and/or 6 after a settable or selectable time period, so that after the dwell time has ended the Stop position is reached again.

Figure 3:
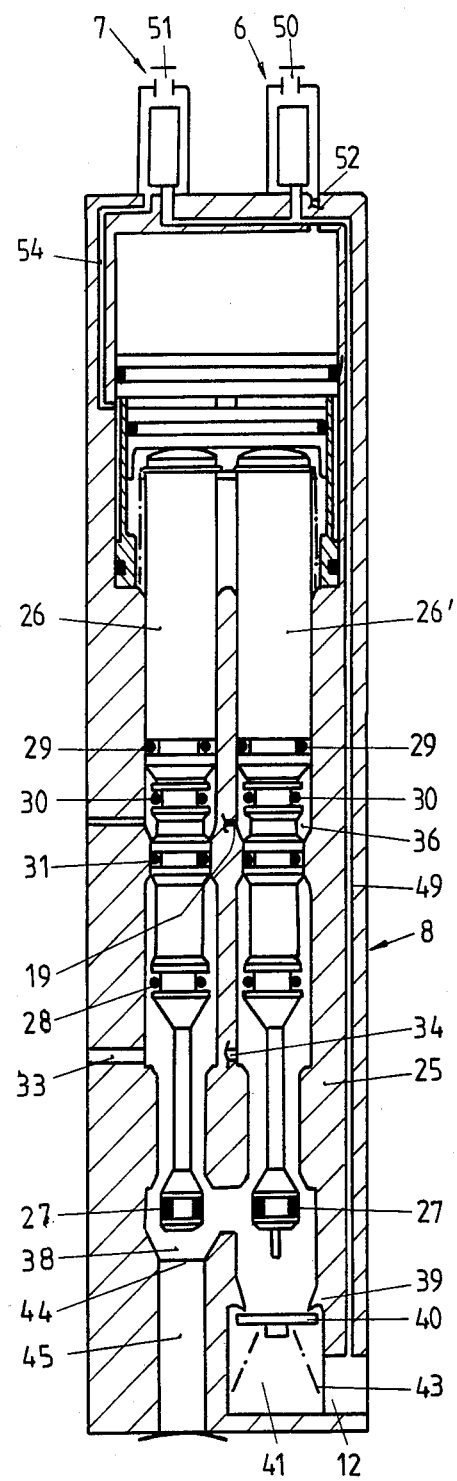

If, on the other hand, switch 1 is turned to the Lower position, only solenoid valve 6, not solenoid valve 7, is energized which results in a relative position of the components as shown in FIG. 3. Control piston 46 travels a relatively longer distance taking along control piston 47, to the work surface of which, however, no compressed air is applied. Thus, lines 17 and 18 to leveling valves 15 and 16 are closed off by seals 29 and 31. Further, by moving into expanded pressure chamber 42, seals 27 are released from their sealing position, so that lines 21 and 22 are connected to atmosphere via vent hole 45. Compressed air can be released from air suspension bellows 23 and 24 under time control so bhat the vehicle body will be deflected.

Figure 4:
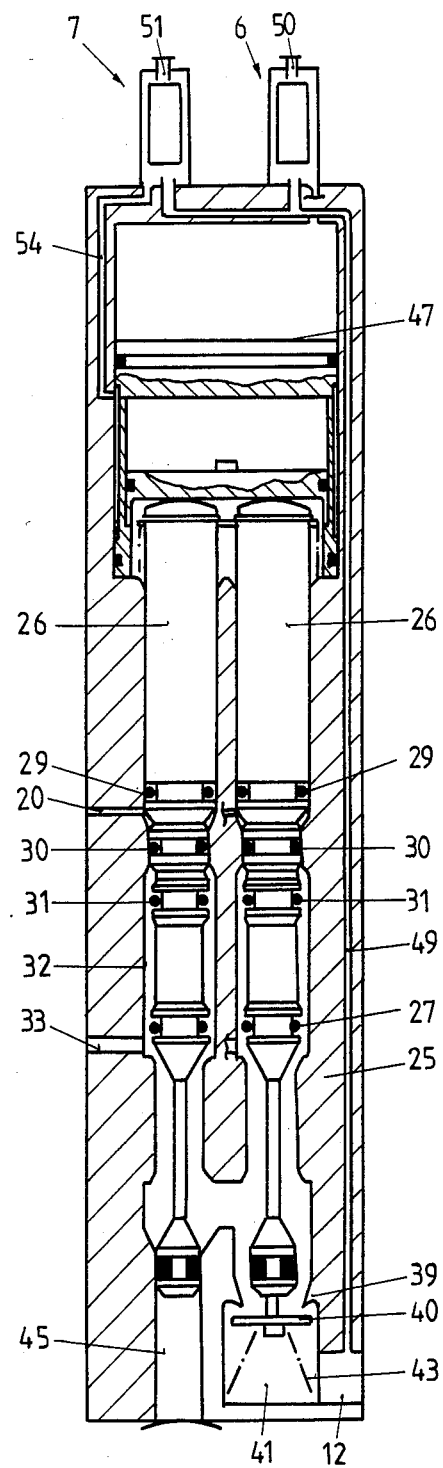
Figure 5:
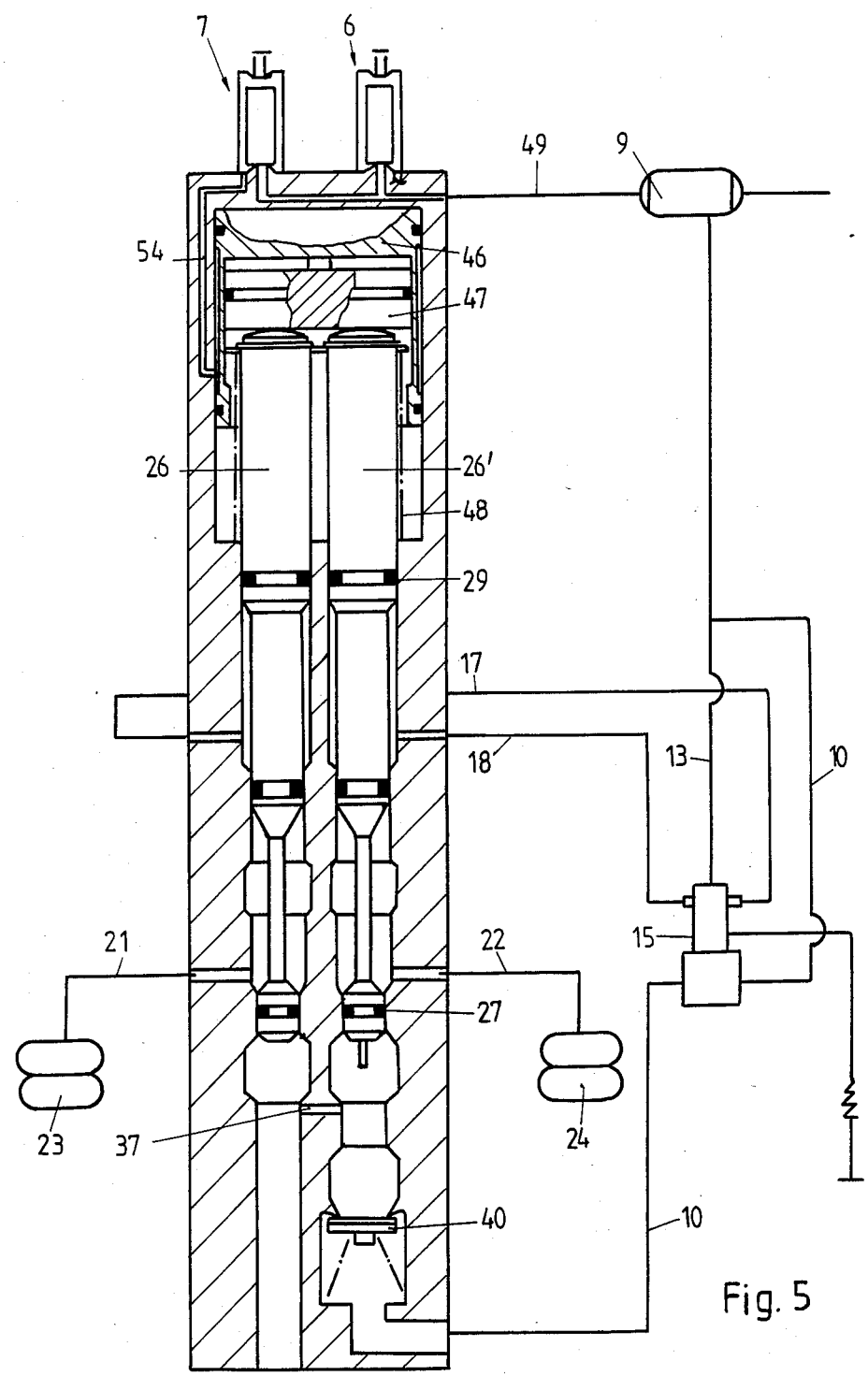

Finally, energizing solenoid valves 6 and 7 simultaneously results in the relative position as shown in FIG. 4 with the Raise position. The strokes of control pistons 46 and 47 are added which results in individual sliding members 26 and 26' being shifted to the position shown. Here, lines 17 and 18 to leveling valves 15 and 16 are closed off by seals 29 and 30. Discharge valve 27, 44 is closed, and extension 60 at individual sliding member 26' has opened intake valve 39, 40 so that compressed air from compressed air reservoir 9 can reach air suspension bellows 23 and 24 via line 10, check valve 11, connection 12 and pressure chamber 42 and finally via lines 21 and 22. Thus, these bellows are filled under time control. The vehicle body is raised.

The exemplified embodiment according to FIG. 5 is actually arranged in a quite similar fashion. Here, individual sliding members 26 and 26' are merely equipped with comparatively fewer seals 27, 28, 29. Supply line 49 leading upwards from connection 12 is missing; instead, it comes directly and separately from reservoir 9. Only one leveling valve 15 is provided whose two control lines 17 and 18 are connected as shown. Leveling valve 15 is supplied with reservoir air via line 13. On the other hand, line 10 supplies compressed air via a blocking device at leveling valve 15 to connection 12. The geometry of individual sliding members 26 and 26' as well as of graduated bore holes 32 and 32' is configured somewhat differently here which results in a switching sequence Stop, Lower, Drive, and Raise according to strokes which become respectively longer. Otherwise, the function is analogous to that of the exemplified embodiment shown in FIGS. 1 to 4.

Figure 6:
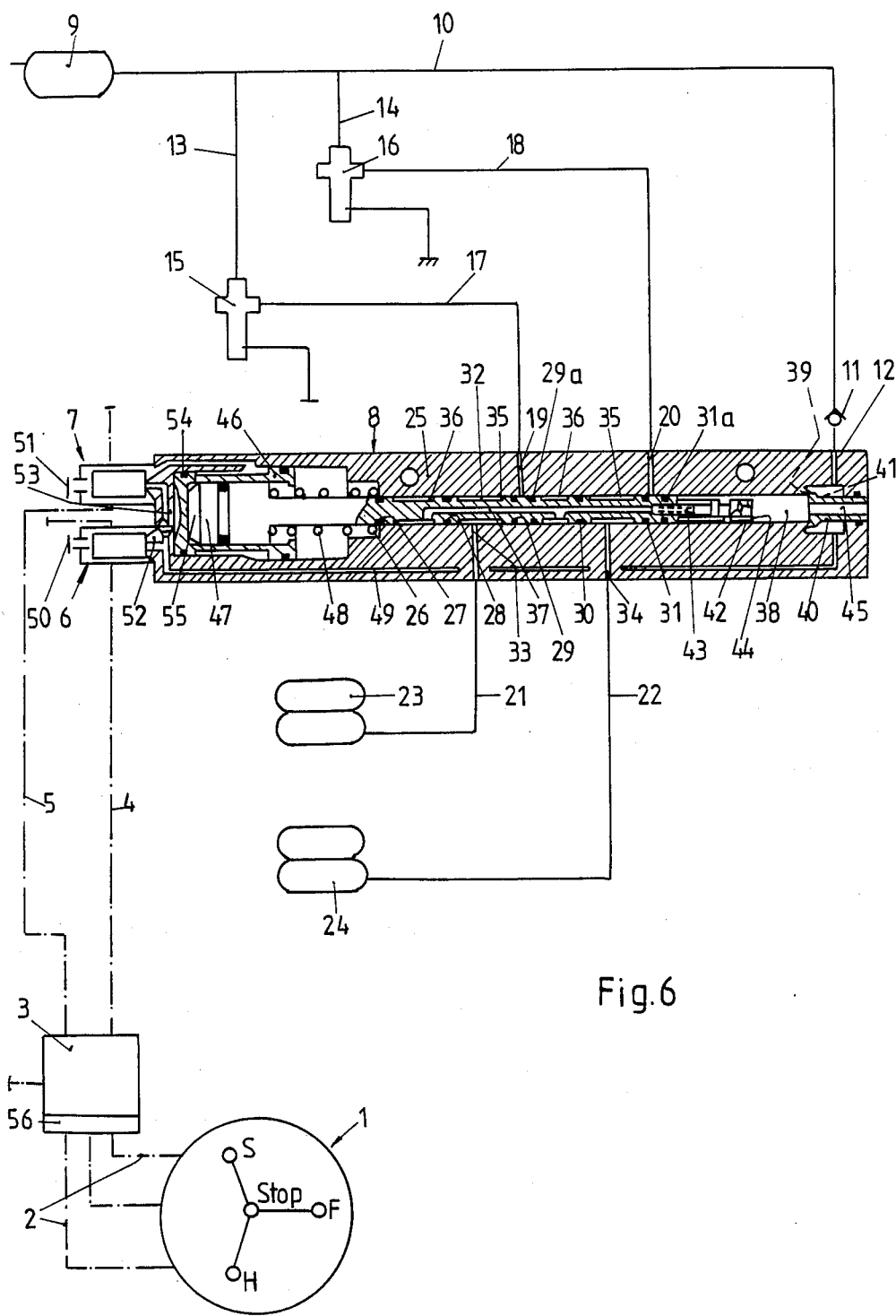

The control arrangement shown in FIG. 6 is again similar in design and function with identical reference numbers being given for comparable components. Switch 1 is configured such that the respective positions Lower, Raise and Drive can be reached from a center position assigned to the Stop position, while switching from an active position to another active position is possible only by passing through the center Stop position. This arrangement again provides for two leveling valves 15 and 16 whereby it is understood that of course only one leveling valve could be used. Here, only a single individual sliding member 26 is provided, which, however accepts all seals 27, 28. 29, 29a, 30, 31, 31a which are provided in the relative position indicated. FIG. 6 shows the Stop position where both lines 17 and 18 on the one hand and respective lines 21 and 22 on the other hand are closed off. Energizing both solenoid valves 6 and 7 corresponds to the Raise position. Energizing solenoid valve 7 only results in the Drive position. Energizing solenoid valve 6 only results in the Lower position.

List of Reference Numbers

1 = Switch
2 = Connecting lines
3 = Power supply arrangement
4 = Electric line
5 = Electric line
6 = Solenoid valve
7 = Solenoid valve
8 = Switching valve
9 = Reservoir
10 = Pneumatic line
11 = Check valve
12 = Connection
13 = Pneumatic line
14 = Pneumatic line
15 = Leveling valve
16 = Leveling valve
17 = Line
18 = Line
19 = Connection
20 = Connection
21 = Line
22 = Line
23 = Air suspension bellows
24 = Air suspension bellows
25 = Housing
26 = Individual sliding member
27 = Seal
28 = Seal
29 = Seal
30 = Seal
31 = Seal
32 = Bore hole
33 = Connection
33 = Connection
34 = Connection
35 = Groove
36 = Groove -continued
List of Reference Numbers 37 = Connecting channel
38 = Exhaust chamber
39 = Housing rim
40 = Valve body
41 = Intake chamber
42 = Pressure chamber
43 = Spring
44 = Rim
45 = Vent hole
46 = Control piston
47 = Control piston
48 = Return spring
49 = Supply line
50 = Vent opening
51 = Vent opening
52 = Line
53 = Work surface
54 = Line
55 = Work surface
56 = Circuit breaker
57 = Extension

I claim:

1. Control arrangement for the random raising and lowering of the vehicle body of air-suspended vehicles with leveling control, including a compressed air source, at least one leveling valve, air suspension bellows assigned to at least one vehicle axle which bellows can be connected to the compressed air source or a non-pressurized exhaust to adjust a specified distance between vehicle body and vehicle axle, and a switching valve with the designated positions Raise, Lower, Drive and Stop built into the pneumatic line connections of the leveling valves with the air suspension bellows or with the compressed air source and the non-pressurized exhaust, which switching valve has at least one sliding member controlled by two solenoid valves, either of which individually, or both simultaneously, may be non-energized or energized to provide an inactivated solenoid position and at least three activated-solenoid positions, whereby said sliding member has four respective positions within the switching valve, said control arrangement being characterized in that (a) the Drive position is assigned to one of the solenoid-activated positions which locates the sliding member (26, 26') so as to connect the air suspension bellows (23, 24) with the leveling valves (15, 16), the Raise position is assigned another of the solenoid-activated positions which locates the sliding member (26, 26') so as to connect the air suspension bellows (23, 24) with the compressed air source (9), the Lower position is assigned to the third solenoid-activated position which locates the sliding member (26, 26') so as to connect the air suspension bellows (23, 24) with the non-pressurized exhaust, and the Stop position is assigned to the inactivated-solenoid position whereby the sliding member (26, 26') is located so as to close off each of the pneumatic lines to the leveling valves (15, 16) and to the air suspension bellows (23, 24); and (b) with a non-pressurized switching valve (8) and/or non-current carrying solenoid valves (6, 7) the sliding member (26, 26') of the switching valve (8) is configured such and is in such an inactivated position that, regardless of the designated position of the switching valve, the respective pneumatic lines (17, 18, 21, 22) from the switching valve (8) to the leveling valves (15, 16) on the one hand and to the air suspension bellows (23, 24) on the other hand are closed off.

2. Control arrangement as set forth in claim 1 characterized in that the Drive position is assigned to the activation of only one solenoid valve (7), the Lower position is assigned to the activation of only the other solenoid valve (6), and the Raise position is assigned to the activation of both solenoid valves (6, 7).

3. Control arrangement as set forth in claims 1 or 2 characterized in that the switching valve (8) includes an electric switch (1) with center position and three other positions, which center position is assigned to the Stop position and the three other positions can be reached only via this center position.

4. Control arrangement as set forth in claims 1 or 2 characterized in that a time-dependent circuit breaker (56) is switched in series with and ahead of the solenoid valves (6, 7) of the switching valve (8).

* * * * *